(12) United States Patent
Whitley et al.

(10) Patent No.: US 7,984,889 B2
(45) Date of Patent: Jul. 26, 2011

(54) ROTATABLE MOUNT FOR A DISPLAY

(75) Inventors: Andy Whitley, Lake in the Hills, IL (US); Dominic Vaglica, Arlington Heights, IL (US)

(73) Assignee: Peerless Industries, Inc., Aurora, IL (US)

( * ) Notice: Subject to any disclaimer, the term of this patent is extended or adjusted under 35 U.S.C. 154(b) by 225 days.

(21) Appl. No.: 12/464,613

(22) Filed: May 12, 2009

(65) Prior Publication Data

US 2009/0314912 A1 Dec. 24, 2009

Related U.S. Application Data

(60) Provisional application No. 61/073,676, filed on Jun. 18, 2008.

(51) Int. Cl.
*A47G 29/00* (2006.01)

(52) U.S. Cl. ............ 248/371; 248/349.1; 248/422; 248/221.11; 248/222.12; 248/222.13; 361/679.01; 361/679.21; 361/679.23

(58) Field of Classification Search ............ 248/371, 248/349.1, 422, 299.1, 274.1, 220.21, 221.11, 248/222.12, 222.13, 222.52, 917, 919, 920, 248/922; 403/321, 326, 330; 108/6; 74/10.8, 74/380, 381, 840; 361/679.01, 679.02, 679.21, 361/679.23, 679.06; 16/340, 341, 367
See application file for complete search history.

(56) References Cited

U.S. PATENT DOCUMENTS

| | | | |
|---|---|---|---|
| 3,791,226 A * | 2/1974 | Cappelle et al. | 74/10.8 |
| 4,297,548 A * | 10/1981 | Little | 200/61.08 |
| D276,612 S | 12/1984 | McVicker et al. | |
| 5,632,463 A | 5/1997 | Sung et al. | |
| 6,199,810 B1 | 3/2001 | Wu et al. | |
| 6,354,552 B1 * | 3/2002 | Chiu | 248/422 |
| D480,948 S | 10/2003 | Patrizzi et al. | |
| D489,377 S | 5/2004 | van Kuijk | |
| D495,713 S | 9/2004 | Pfister et al. | |
| D560,676 S | 1/2008 | Wohlford et al. | |
| D560,677 S | 1/2008 | Wohlford et al. | |
| D561,189 S | 2/2008 | Wohlford et al. | |
| D577,728 S | 9/2008 | Sculler et al. | |
| D587,258 S * | 2/2009 | Vaglica et al. | D14/239 |
| 7,837,159 B2 * | 11/2010 | Tsuo et al. | 248/131 |
| 2009/0314912 A1 * | 12/2009 | Whitley et al. | 248/299.1 |

OTHER PUBLICATIONS

U.S. Appl. No. 29/319,929, filed Jun. 17, 2008, Vaglica et al.

\* cited by examiner

*Primary Examiner* — Terrell Mckinnon
*Assistant Examiner* — Todd M. Epps
(74) *Attorney, Agent, or Firm* — Foley & Lardner LLP

(57) ABSTRACT

A rotatable display mount for mounting a display device at desired rotational orientation. In one set of embodiments, the rotatable display mount comprises a base plate adapted to operatively connect the display mount to a mounting surface, a sprocket plate operatively connected and rotatable in relation to the base plate, the sprocket plate adapted to be operatively connected to the display device, and a latch member selectively engageable with the sprocket plate. Rotational orientation of the display device is established at defined angular orientations by engagement of the sprocket plate with the latch member.

10 Claims, 16 Drawing Sheets

ROTATABLE MOUNT FOR A DISPLAY

CROSS REFERENCE TO RELATED PATENT APPLICATIONS

The present application claims priority to U.S. Provisional Patent Application No. 61/073,676, filed Jun. 18, 2008. The contents of this application are incorporated herein by reference in their entirety.

FIELD OF THE INVENTION

The present invention relates generally to the field of mounts for display devices, including LCD and plasma flat panel display devices. More particularly, the present invention relates to a rotatable mount for display devices.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel televisions have become enormously popular in both commercial and residential sectors. As the prices for plasma and liquid crystal display ("LCD") flat panel displays have continued to fall, and the quality for the same devices have improved, more and more businesses and individuals have purchased such devices for both home and business purposes.

One of the advantages of flat panel display devices is the extended aspect ratio of most flat panel devices. For example, many flat panel display devices are configured with a 16:9 aspect ratio. Thus, the display device possesses a distinct landscape orientation, where the elongated dimension is disposed substantially horizontally, and a portrait orientation, where the elongated dimension is disposed substantially vertically.

In the commercial or educational setting, it is often desirable to switch the display device between the landscape orientation and the portrait orientation, depending on the application. For example, in a business or educational setting, it may be desirable to display a document on the display device in portrait mode, but to display a video or slide presentation in landscape mode. However, flat panel display devices usually require professional installation and, once the display is secured to the mount, it is often difficult to access and adjust the orientation of the display. Altering the rotational orientation of the display device typically requires the display device be removed from the conventional display mount. The display devices, however, are often quite expensive and awkward to manipulate, making reorientation of the display device between a landscape and a portrait orientation difficult and often impractical.

Further, conventional commercial mounts typically do not permit the display to be orientated in positions other than landscape or portrait orientations. In certain applications, such as advertising systems implementing a display device, it may be desirable to mount the display device at a unique rotational orientation to enhance consumer interest. It may further be desirable to periodically and automatically alter the rotational orientation.

SUMMARY OF THE INVENTION

Various embodiments of the present invention comprise systems for rotatably mounting a display device to a mounting surface. The display device may be selectively orientated at defined rotational angles without removal of the device from the mount.

In an embodiment of the invention, a rotatable display mount comprise a base plate and a sprocket plate operatively connected to the base plate and rotatable in relation to the base plate. The base plate is adapted to operatively connect the rotatable display mount to a mounting surface. The sprocket plate is adapted to operatively connect to a display device. Rotation of the sprocket plate in relation to the base plate, imparts substantially simultaneous rotation to the display device in a plane substantially parallel to the mounting surface. The rotatable display mount may further include a latch plate operatively connected to the base plate. The latch plate is selectively translatable for engagement with the sprocket plate such that rotation of the display device is substantially prevented when the latch plate engages the sprocket plate. The display device is rotatably orientable when the latch plate is disengaged. The rotatable display mount may further comprise a biasing member provided to maintain engagement of the latch plate. The sprocket plate further comprises a plurality of engagement features disposed about its perimeter. The rotational orientation of the display device may be established by engaging the latch plate with one or more of the plurality of engagement features.

In another embodiment of the invention, a rotatable display mount comprises a base plate, a sprocket plate operatively connected to the base plate and rotatable in relation to the base plate, and a pivoting latch arm operatively connected to the base plate and selectively engageable with the sprocket plate. The base plate is adapted to operatively connect the rotatable display mount to a mounting surface. The sprocket plate is adapted to operatively connect a display device. Rotation of the sprocket plate in relation to the base plate, imparts substantially simultaneous rotation to the display device in a plane substantially parallel to the mounting surface. The pivoting latch arm is selectively rotatable for engagement with the sprocket plate such that rotation of the display device is substantially prevented when the pivoting latch arm engages the sprocket plate. The display device is rotatably orientable when the latch arm is disengaged. The rotatable display mount may further comprise a biasing member provided to maintain engagement of the latch arm. The sprocket plate may further comprises a plurality of engagement features disposed about its perimeter. The rotational orientation of the display device may be established by engaging the latch arm with one or more of the plurality of engagement features.

Embodiments of the present invention provide a mounting system that allows one to efficiently orientate a flat panel display, including a LCD or plasma display or a screen adapted for use with a projection device, at a defined rotational angle, without removing the display device from the mount. In several of the embodiments, the display device is rotatable and selectively lockable at various set incremental angles from zero to 360 degrees.

These and other advantages and features of the invention, together with the organization and manner of operation thereof, will become apparent from the following detailed description when taken in conjunction with the accompanying drawings, wherein like elements have like numerals throughout the several drawings described below

DETAILED DESCRIPTION OF VARIOUS EMBODIMENTS

Figure 1:
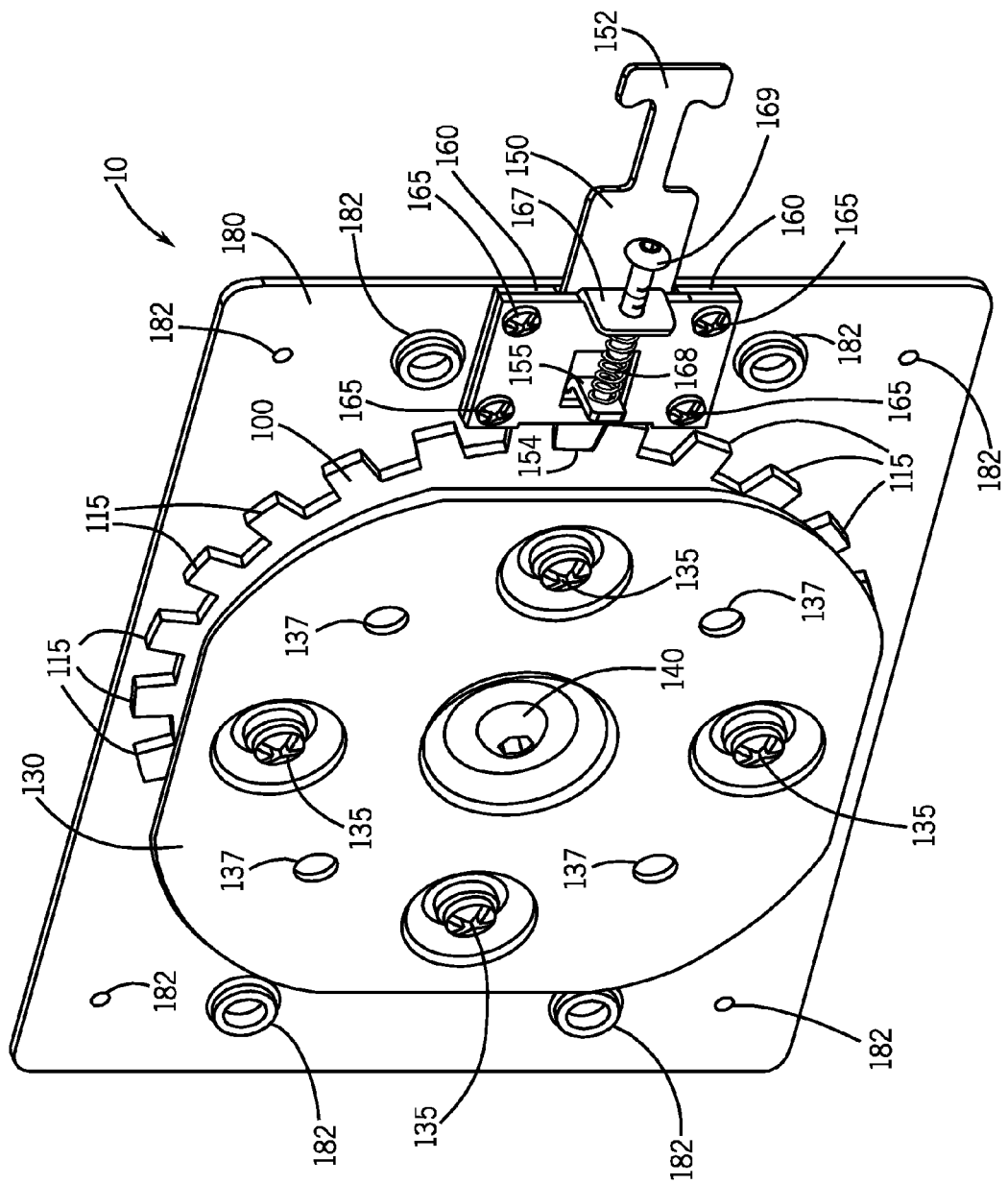
FIG. 1 is a perspective view of a rotatable display mount according to an embodiment of the present invention showing, a base plate, a sprocket plate operatively connected and rotatable in relation to the base plate, an adapter plate operatively connected to the sprocket plate, and a latch plate operatively connected to the base plate and selectively engageable with the sprocket plate.

Referring to FIG. 1, a rotatable display mount 10 constructed in accordance with an embodiment of the present invention is shown. The rotatable display mount 10 comprises a sprocket plate 100 operatively connected to a base plate 180 and rotatable in relation to the base plate 180. The rotatable display mount 10 may further include a latch plate 150 operatively connected to the base plate 180 and selectively engageable with the sprocket plate 100.

Figure 2:
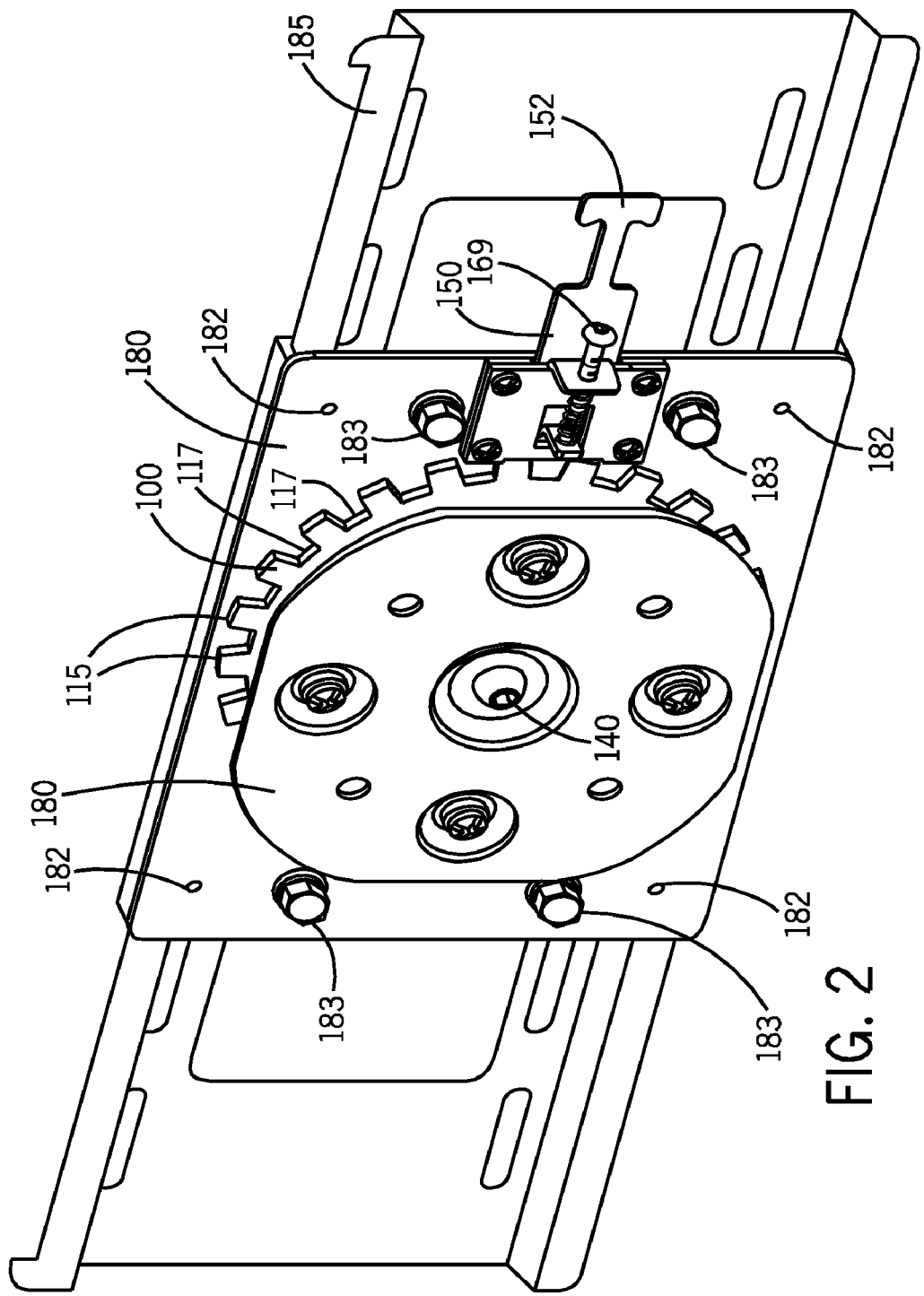
FIG. 2 is a perspective view of the rotatable display mount of FIG. 1, further showing a wall bracket operatively connected to the rotatable display mount and adapted for securement of the rotatable display mount to a mounting surface.
Figure 3:
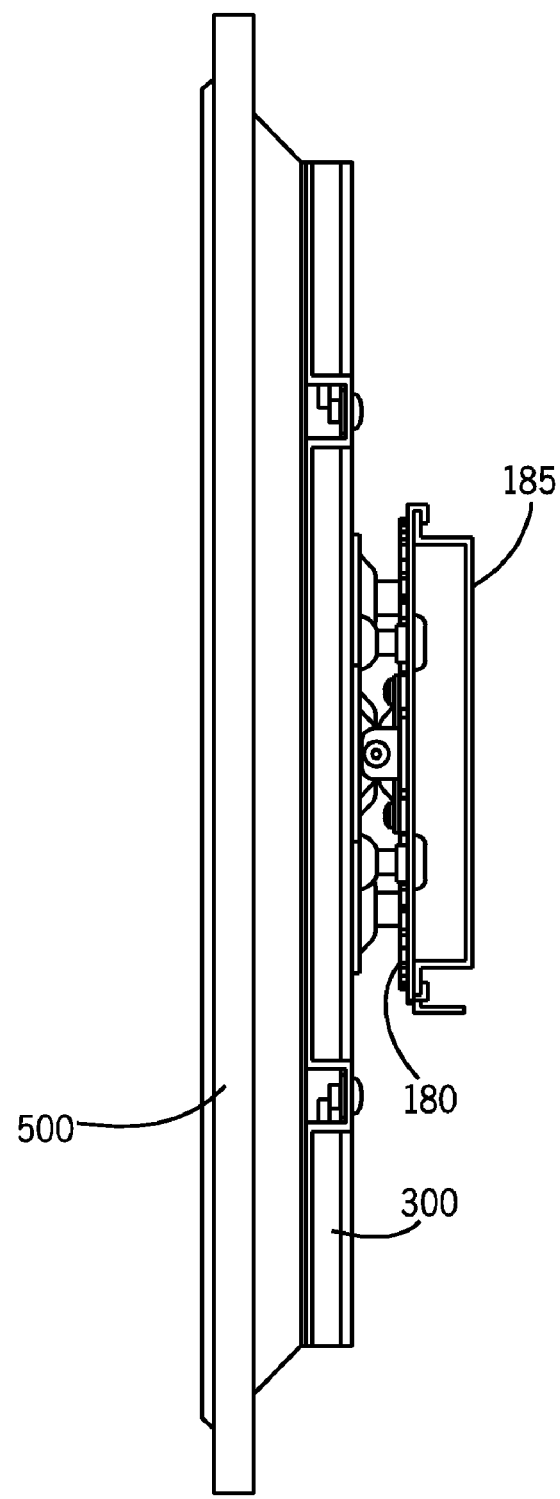
FIG. 3 is a end view of the display mount and the wall bracket of FIG. 2, further showing a screen adapter operatively connected to the rotatable display mount and a display device operatively connected to the screen adapter.

In the embodiment of FIG. 1, the base plate 180 is adapted to secure the rotatable display mount 10 to a mounting surface such as a wall, ceiling, cart, stand, or other mounting surface. The base plate 180 may generally comprise a relatively thin and substantially rigid plate. The base plate 180 may be configured for direct attachment to the mounting surface or it may be configured to operatively couple to a wall bracket configured for securement to the mounting surface. The wall bracket or an additional intermediary bracket may provide additional features, such as the capability to extend the display device from the mounting surface, or tilt or pan of the display device in relation to the mounting surface. For example, as depicted in FIGS. 2 and 3, the base plate 180 may be operatively coupled to the front of a wall bracket 185. A rear surface of the wall bracket 185 is adapted for attachment to the mounting surface. A plurality of mounting holes 182 may be disposed in the base plate 180 to interface with mounting features of the wall bracket 185. A plurality of fasteners 183 may be received in the mounting holes 182 to secure the base plate 180 to the wall bracket 185.

Figure 4A:
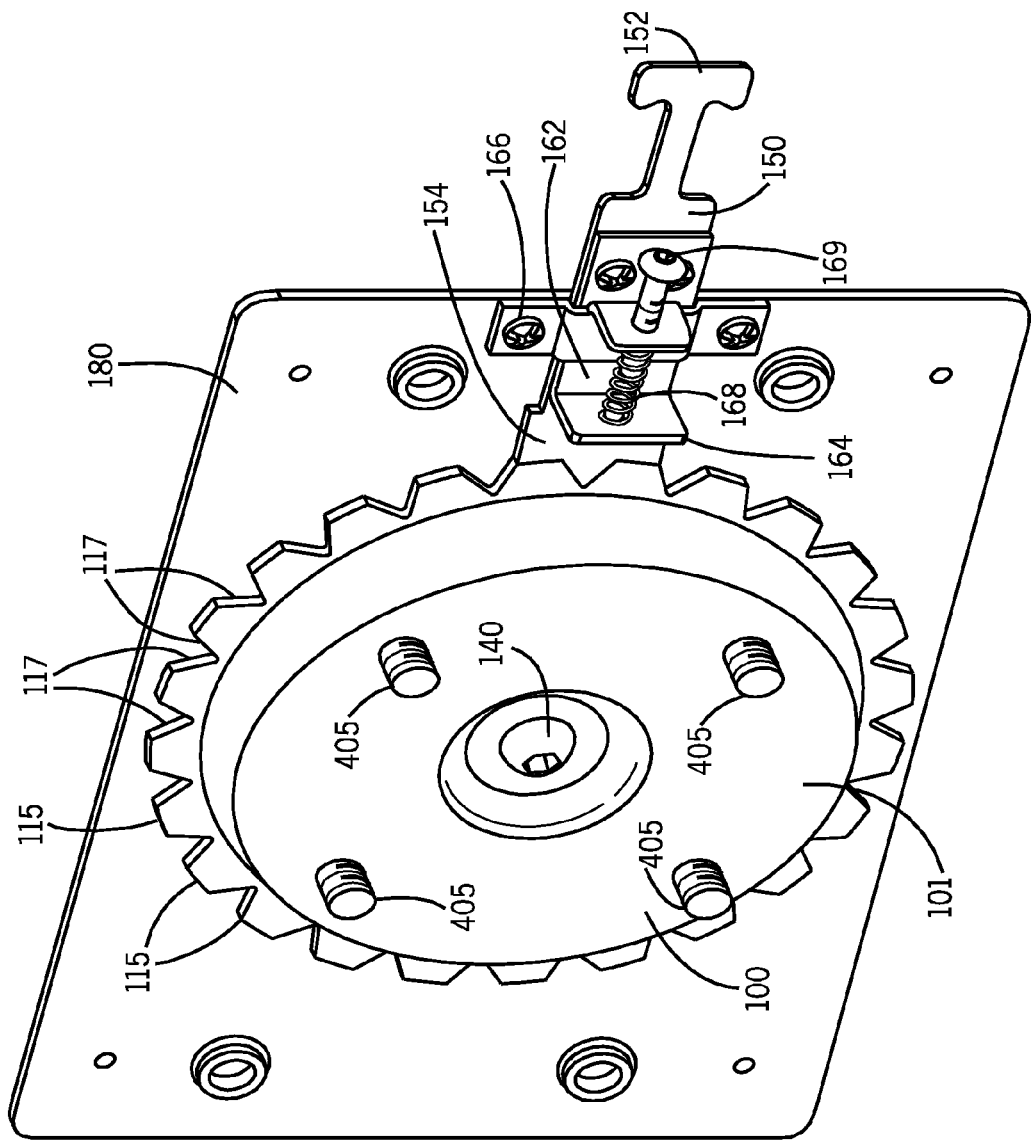
FIG. 4A is a perspective view of another embodiment of the rotatable display mount of FIG. 1, without an adapter plate.
Figure 4B:
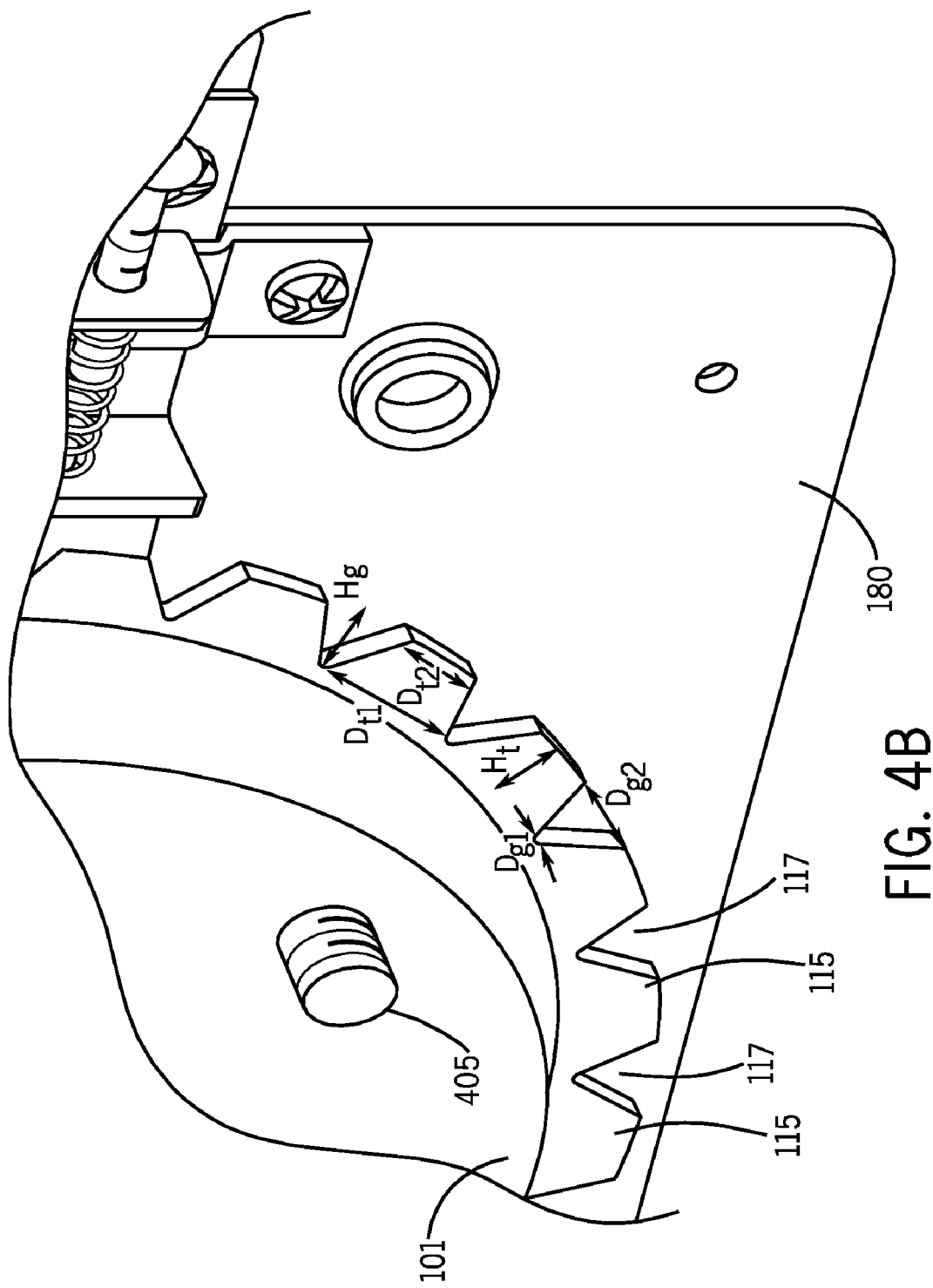
FIG. 4B is an enlarged view of a portion of the rotatable display mount without an adapter plate.
Figure 5:
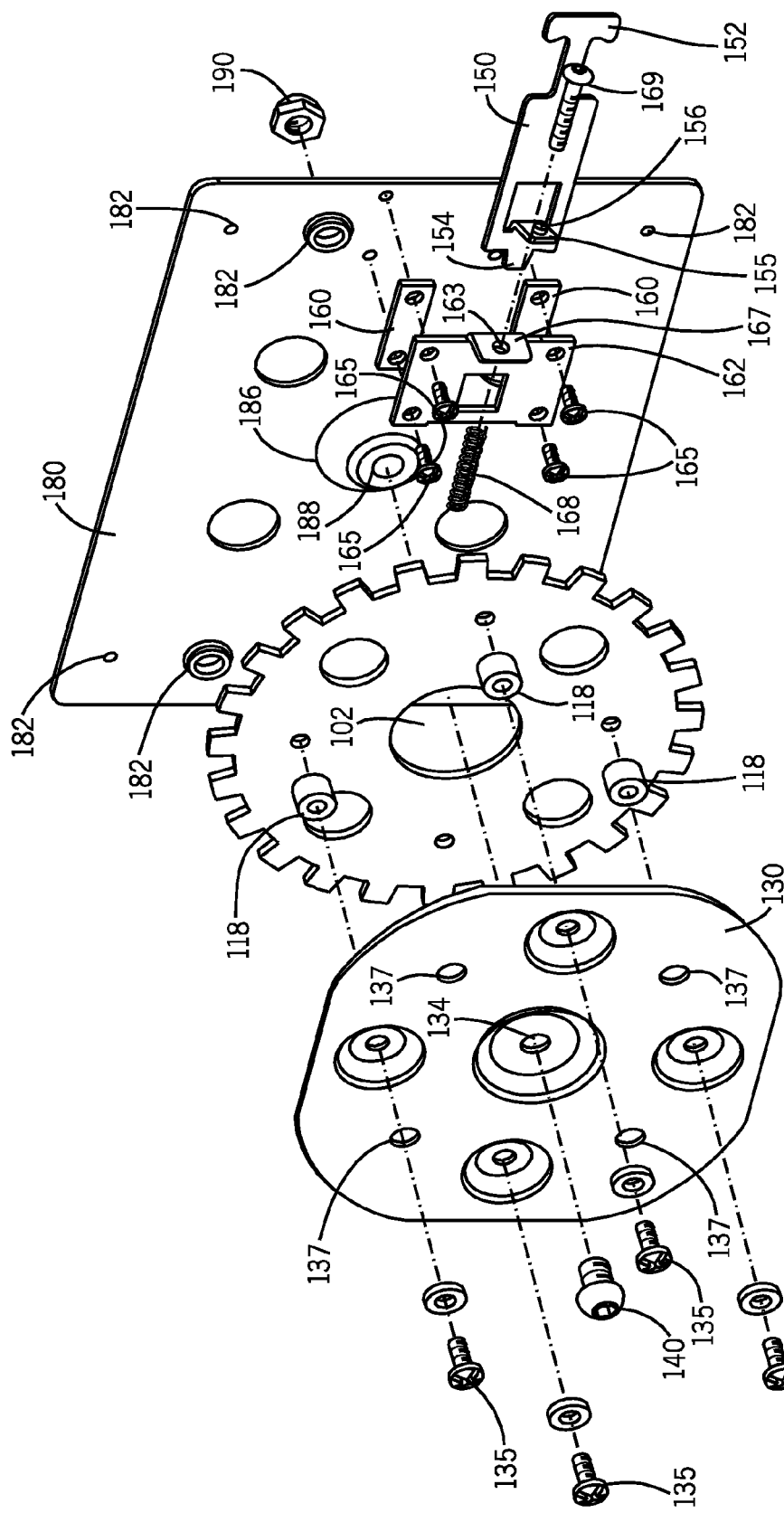
FIG. 5 is an exploded view of the rotatable display mount of FIG. 1.

The sprocket plate 100 is operatively connected to the base plate 180 and is rotatable in relation to the base plate 180 in a plane substantially parallel to the mounting surface. The sprocket plate 100 may generally comprise a relatively thin and substantially rigid and substantially circular plate. The sprocket plate may further comprise a plurality of plurality of teeth 115 disposed about its perimeter. As shown in FIGS. 4 and 5, the sprocket plate 100 may be configured for operative connection to the display device. A plurality of fasteners 405 may be provided extending outwardly from a front surface 101 of the sprocket plate 100. The fasteners 405 may be configured for direct receipt in the rear of a display device or by an intermediary display adapter adapted for mounting to a specific display device or incorporating a standardized display mounting configuration.

In the embodiment of FIG. 1, an adapter plate 130 is operatively connected to the sprocket plate 100 and adapted to rotate with the sprocket plate 100. The adapter plate 130 may be configured to directly attach to the display device or, as shown in FIG. 3, a screen adapter 300 may operatively couple the adapter plate 130 to a display device 500. The adapter plate 130 may be secured to the sprocket plate 100 by a plurality of fasteners 135. A plurality of mounting holes 137 may be provided to attach either the display device 500 or the screen adapter 300. As illustrated in FIG. 5, the adapter plate 130 may be disposed a distance from the from the sprocket plate 100 by a plurality of spacers 118.

Figure 6:
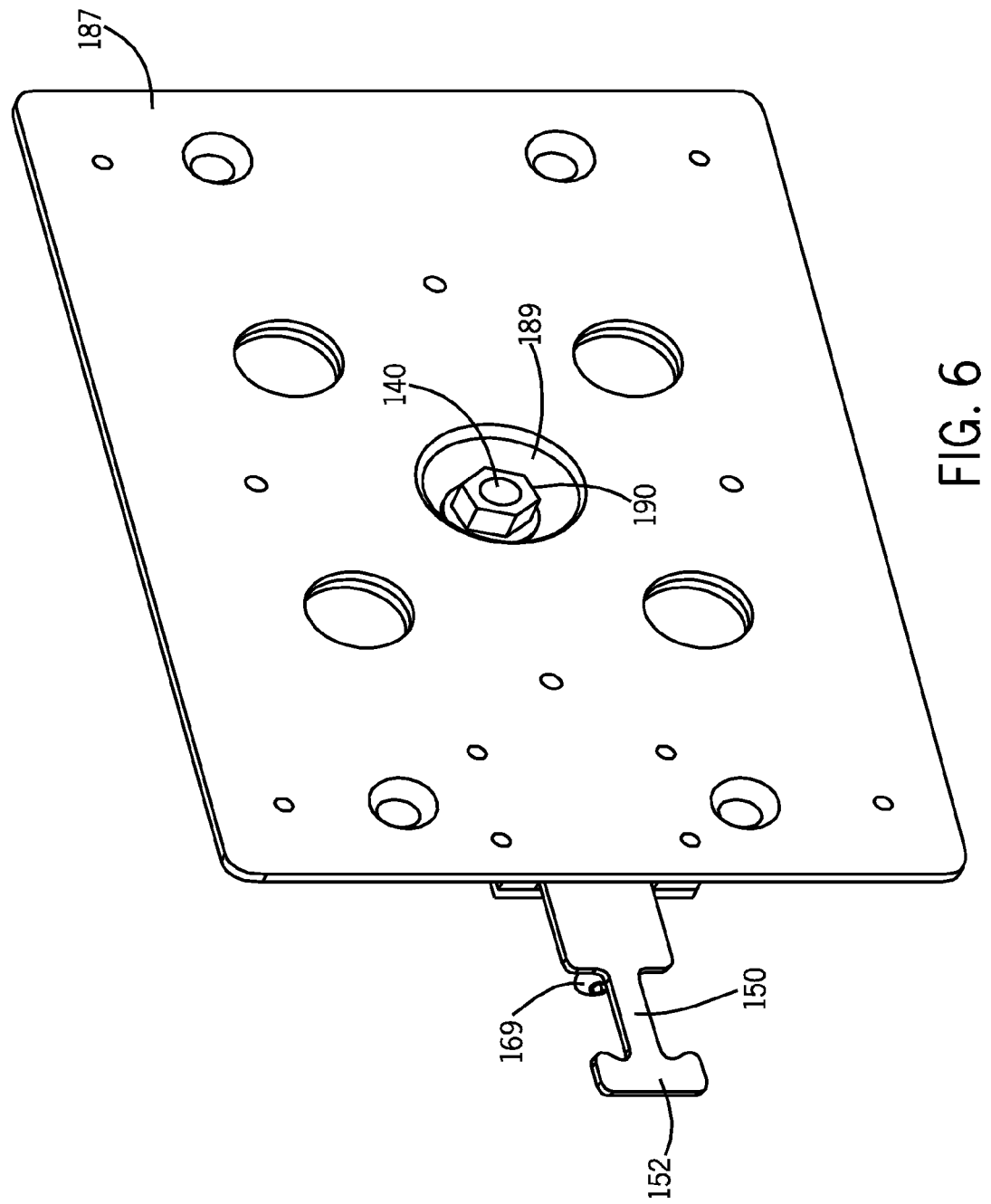
FIG. 6 is a rear perspective view of the rotatable display mount of FIG. 1.

A number of coupling structures may be employed to rotatably orientate the sprocket plate 100 in relation to the base plate 180 in order to permit relative rotation of the display device 500 in relation to the base plate 180. For example, various bearing surfaces and or structures may be used to achieve smooth rotation of the display device in relation to the base plate 180, including roller bearings, ball bearings, bearing surfaces, axle, pin, or other structure. As illustrated in FIG. 5, a central fastener 140 is received by an adapter hole 134 disposed in substantially the center of the adapter plate 130. The central fastener 140 passes through a sprocket plate hole 102 disposed in substantially the center of the sprocket plate 100. The central fastener 140 is further received in base plate hole 188 and is operatively captured by the base plate 180. As shown in FIGS. 5 and 6, the central fastener 140 is captured by a securing feature 190. The securing feature 190 resides within a recess 189, providing the base plate 180 with a smooth mounting surface 187. As depicted in FIGS. 5 and 6, the securing feature 190 comprises a nut. In a particular embodiment, the securing feature 190 is a lock nut, however, other structures may also be used. Thus, the sprocket plate 100 is rotatably received on a hub 186 extending from the base plate 180 through the sprocket plate hole 102. The sprocket plate 100 and attached display device 500 are thereby rotatable about an axis substantially defined by the hub 186.

Figure 7A:
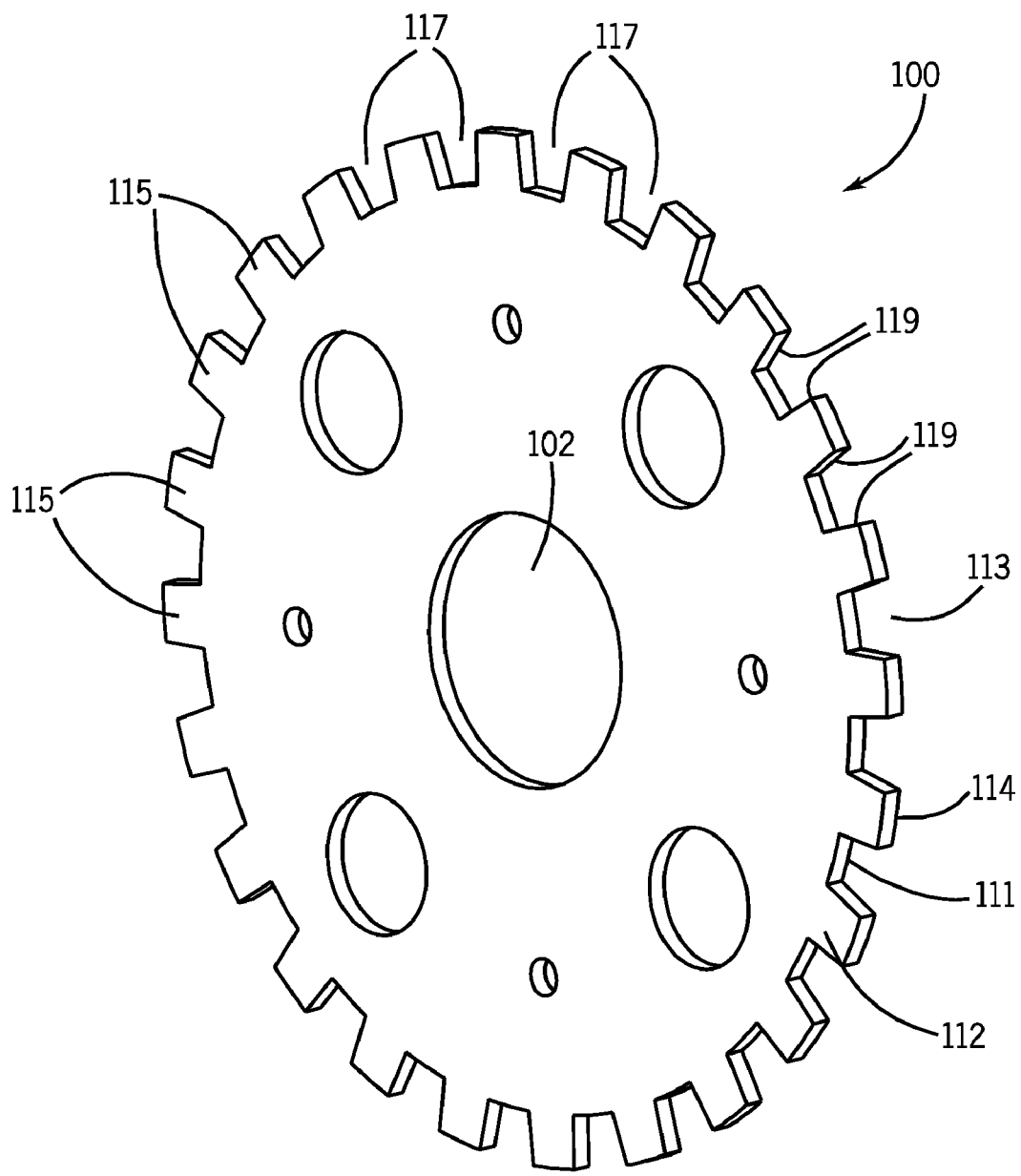
FIG. 7A is a perspective view of the sprocket plate of FIG. 1.
Figure 7B:
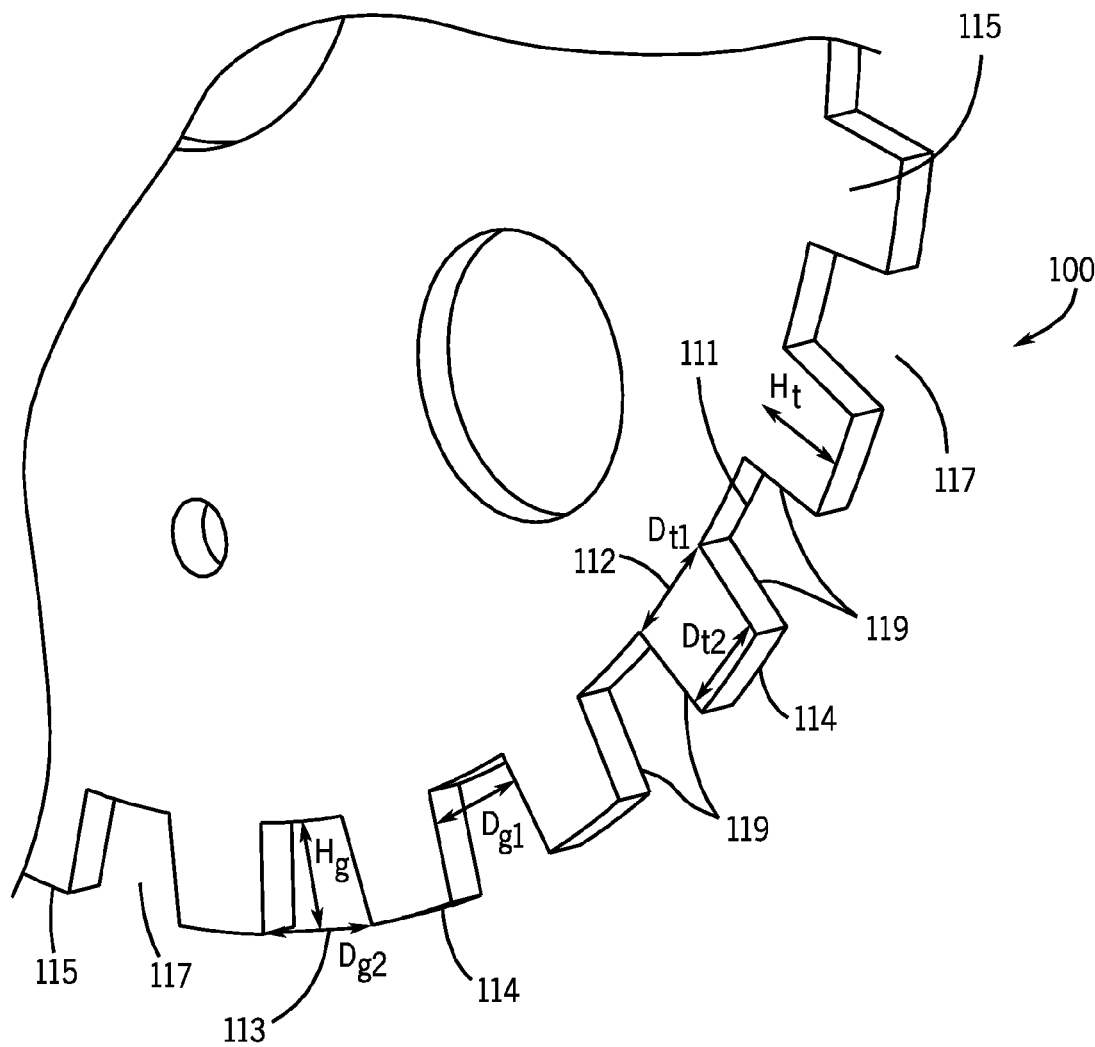
FIG. 7B is an enlarged view of the portion of the sprocket plate shown in FIG. 7A.

The sprocket plate 100 may include a plurality of teeth 115 disposed about its perimeter. In general, the plurality of teeth 115 are disposed uniformly about the perimeter of the sprocket plate 100. The plurality of teeth 115 may have a substantially trapezoidal shape as indicated in FIGS. 7A and 7B with a first base 112, a second base 114, and a pair of sloped lateral sides 119 extending between the first base 112 and the second base 114. Accordingly, as illustrated in FIG. 7B, the first base 112 may be of dimension $D_{t1}$, and the second base 114 may be of dimension $D_{t2}$, where $D_{t1}$ is greater than $D_{t2}$. Further, the first base 112 and the second base 114 are separated by a height of dimension of $H_t$.

A plurality of gaps 117 are interspaced between the plurality of teeth 115. The plurality of gaps 117 may also have a substantially trapezoidal shape with a first base 111, a second base 113, and a pair of sloped lateral sides 119 extending between the first base and second base. The plurality of gaps may be similarly described, with the first base 111 may be of dimension $D_{g1}$, and the second base 113 may be of dimension of $D_{g2}$, where $D_{g1}$ is less than $D_{g2}$. Likewise, the first base 111 and the second base 113 are separated by a height of dimension of $H_g$. The sprocket plate 100 may be configured where the dimensions $D_{t1}$ and $D_{g1}$ are about equal, the dimensions $D_{t2}$ and $D_{g2}$ are about equal, and the dimensions $H_{t1}$ and $H_{g1}$ are about equal. However, embodiments of the plurality of teeth 115 and the plurality of gaps 117 are readily constructed. For example, the plurality of teeth 115 and the plurality of gaps 117 may comprise profiles other than and/or in addition to trapezoidal, including substantially triangular profiles.

In another embodiment of the sprocket plate 100, the plurality of teeth 115 possess a more pronounced trapezoidal shape. As shown in FIG. 4, dimension $D_{g1}$ of the plurality of gaps 117 can be set to approach or equal zero. As dimension $D_{g1}$ decreases the plurality of gaps 117 become substantially triangular-like in shape. Additionally, the sprocket plate 100 may be constructed with other embodiments of the plurality of teeth 115 and the plurality of gaps 117, including various arcuate profiles.

With reference to FIGS. 1 and 5, a latch plate 150 is operatively coupled to the base plate 180. The latch plate 150 generally comprises an elongated, substantially rigid, plate with a grasping end 152 and an engagement end 154 disposed substantially opposite the grasping end. The latch plate 150 is adapted for sliding translation in relation to the base plate 180 and selectively engageable with the sprocket plate 100. The latch plate 150 may be slidingly constrained between a pair of latch guides 160. The latch plate 150 may further be constrained by a biasing bracket 162 operatively connected and disposed over the pair of latch guides 160. The biasing bracket 162 may be secured to the latch guides 160 and or the base plate 180 by a plurality of fasteners 165.

As shown in FIG. 1, a biasing member 168 may be disposed between surfaces of the latch plate 150 and the biasing bracket 162. In an embodiment, the latch plate 150 includes an upraised biasing surface 155 adapted to receive an end of the biasing member 168. The biasing surface may further include a retention protrusion 158 to partially capture the biasing member 168. The biasing bracket 162 may also include an upraised surface 167 adapted to receive an opposite end of the biasing member 168. The upraised surface 167 may further include a hole 163. The hole 163 is adapted to optionally receive a security fastener 169. In an embodiment, the biasing member 168 is a coil compression spring.

As depicted in FIG. 4, the latch plate 150 is similarly slidingly constrained in relation to the base plate 180 by a U-bracket 166 secured to the base plate 180 and adapted to slidingly receive the latch plate 150. A biasing bracket 162 may be secured to the latch plate 150. The biasing bracket 162 may include a surface 164 adapted to receive an end of the biasing member 168. An opposite end of the biasing member 168 is operatively coupled to the U-bracket 166. The security fastener 169 is optionally operatively coupled to the U-bracket 166.

With reference to FIGS. 1, 4, and 5, the biasing member 168 is selectively orientable between a relaxed orientation and a compressed orientation. In the relaxed orientation, the biasing member 168 biases the latch plate 150 toward the interior of the base plate 180 and into engagement with the sprocket plate 100. The biasing member 168 is selectively placed in the compressed orientation by sliding the latch plate 150 away from the interior of the base plate 180 and the sprocket plate 100, disengaging the latch plate 150 from the sprocket plate 100. Translation of the latch plate 150 may be achieved by applying a lateral pulling force in a direction substantially opposite the interior of the base plate 180 at the grasping end 152 of the latch plate 150. Sufficient translation in this manner disengages the latch plate 150 from the sprocket plate 100. The biasing member 168 returns the latch plate 150 to the engagement orientation when the pulling force is removed or becomes less than the biasing force of the biasing member 168. The security fastener 169 may be selectively orientated in relation to the latch plate 150 to prevent disengagement of the latch plate 150 from the sprocket plate 100, thereby preventing rotation of the display device 500.

Figure 10:
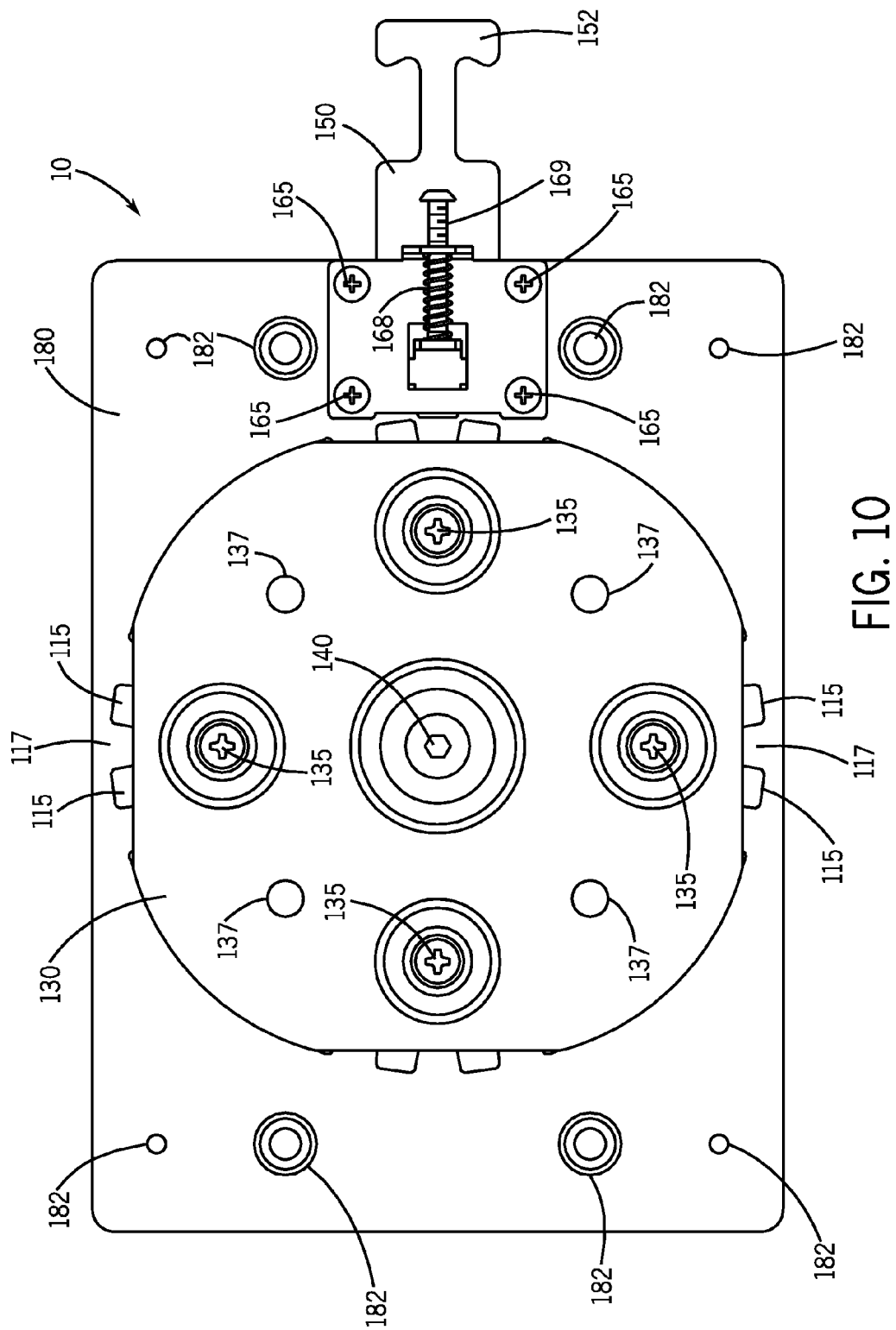
FIG. 10 is a front view of the rotatable display mount of FIG. 1, showing the latch plate disengaged from the sprocket plate and the sprocket plate and adapter plate orientation at about zero degrees.
Figure 11:
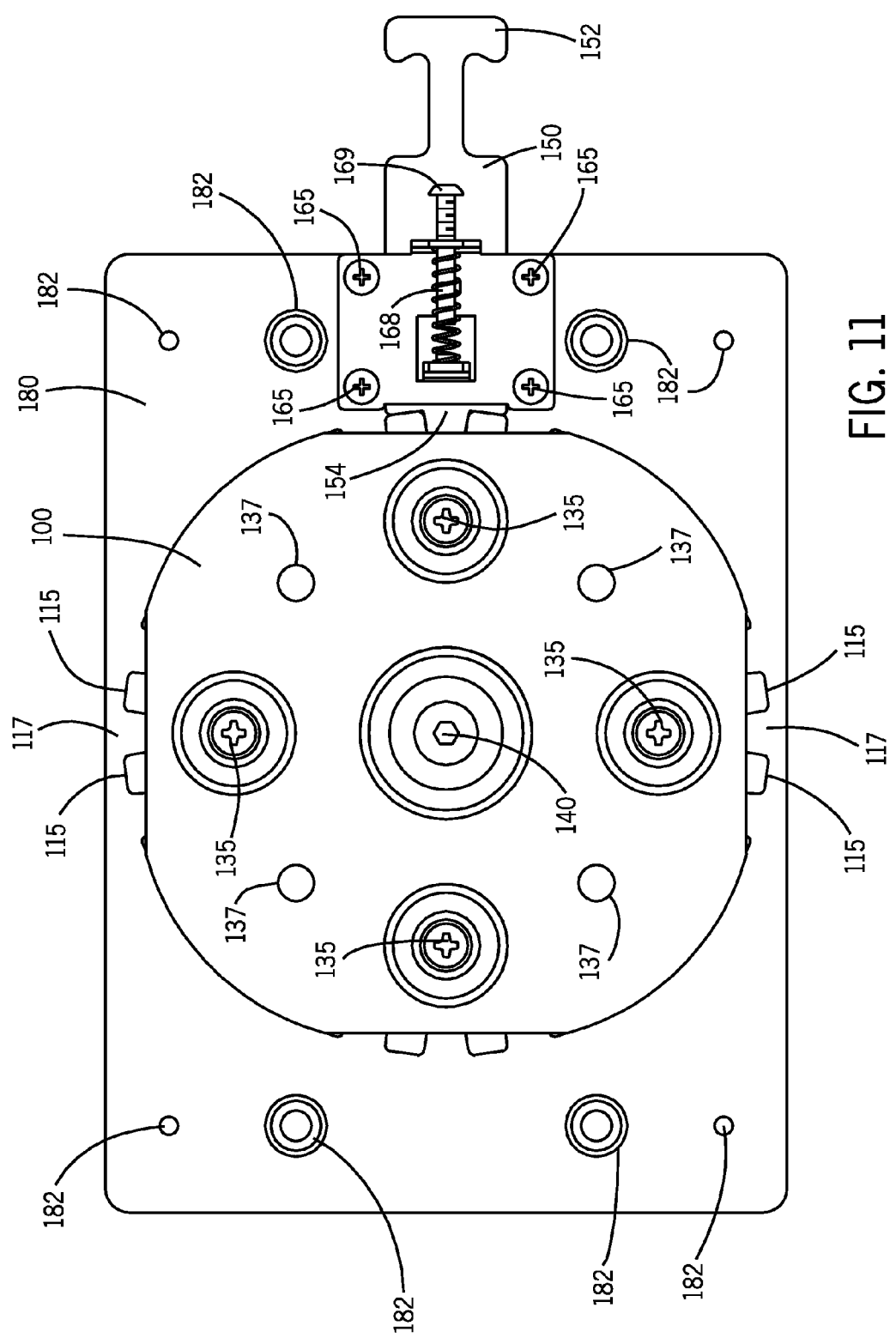
FIG. 11 is a front view of the rotatable display mount of FIG. 1, showing the latch plate engaged with the sprocket plate.

The engagement end 154 of the latch plate is configured to substantially match the profile of the perimeter of the sprocket plate 100 so that the latch plate 150 may engage the sprocket plate 100 when in the engagement orientation. To this end, the engagement end 154 may include an engagement protrusion 159 extending from the engagement end 154. The engagement end 154 is adapted to be at least partially received in one of the plurality of gaps 117. In the engagement orientation, the latch plate 150 prevents rotation of the sprocket plate 100 and the display device 500 attached thereto. As shown in FIG. 10, when the latch plate 150 is pulled from the engagement orientation, disengaging the engagement protrusion 159 from one of the plurality of gaps 117, the sprocket plate 100 and the display device are freely rotatable in relation to the base plate 180. As shown in FIG. 11, when the latch plate 150 is allowed to return to the engagement orientation, the engagement protrusion 159 engages one of the plurality of gaps 117, substantially preventing the sprocket plate 100 and the display device from rotating in relation to the base plate 180.

Figure 8:
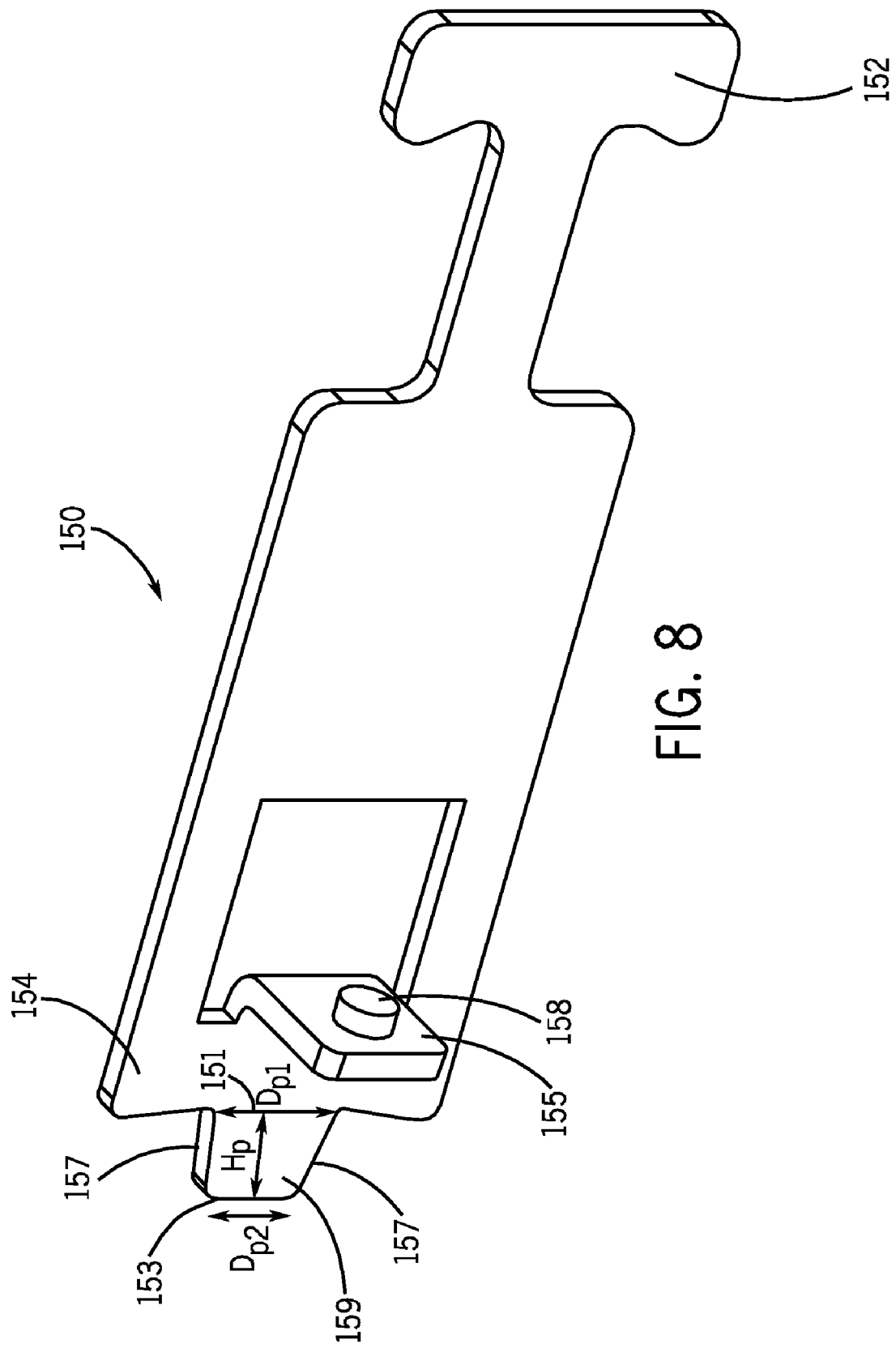
FIG. 8 is a perspective view of the latch plate of FIG. 1.

As shown in FIG. 8, the engagement protrusion 159 may have a substantially trapezoidal shape to correspond with the plurality of gaps 117 similarly shaped. For example, the engagement protrusion 159 may have a first base 151, a second base 153, and a pair of sloped lateral sides 157 extending between the first base 151 and second base 153. Accordingly, the engagement protrusion 159 may be described where the first base 151 may be of dimension $D_{p1}$, and the second base 153 may be of dimension of $D_{p2}$, where $D_{p1}$ is greater than $D_{p2}$. Further, the first base 151 and the second base 153 are separated by a height of dimension of $H_p$.

To selectively engage the engagement protrusion 159 with one of the plurality of gaps 117, $D_{p2}$ must be less than $D_{g2}$. Further, it will be appreciated, to achieve maximum engagement, $D_{p1}$ should be slightly less than $D_{g1}$ and $H_p$ should be slightly less than $H_g$. As shown in FIG. 4, when the plurality of gaps 117 are substantially triangular in shape, dimension $D_{p2}$ of the engagement protrusion 159 may approach zero or be appropriately radiused. To further improve engagement, the slopes of the respective pair of sloped lateral sides 119/157 should be about equal, such that the engagement protrusion 159 nests snugly within one of the plurality of gaps 117, as depicted in FIGS. 1 and 4.

Additional engagement between the latch plate 150 and the sprocket plate 100 may be achieved by further conforming the engagement end 154 to the profile of the plurality of teeth 115. As shown in FIG. 4, the latch plate 150 may be configured to engage one of the plurality of gaps 117 and at least a portion of adjacent teeth of the plurality of teeth 115. The rotatable display mount 10 may be constructed using other configurations as well. For example, the orientation of engagement between the sprocket plate 100 and the latch plate 150 may be reversed, such that the latch plate 150 is provided with an engagement recess adapted to mate with one or more of the plurality of the teeth 115. Still further, the exemplary configurations have been described comprising engagement of one of the plurality of teeth 115 and/or on of the plurality of gaps 117. However, it will be appreciated that the foregoing structures are adaptable to engage more than one of the plurality of teeth 115 and more than one of the plurality of gaps 117. Further, additional latch plates 150, which may be coupled with appropriate linkages, may be included for additional engagement points with the sprocket plate 100. Still further, the sprocket plate 100 may be configured as an internal sprocket where the plurality of teeth 115 and the plurality of gaps 117 are inwardly facing toward a central point. In this configuration, at least the engagement end 154 of the latch plate 150 is disposed within circumference defined by the sprocket plate 100.

Figure 9A:
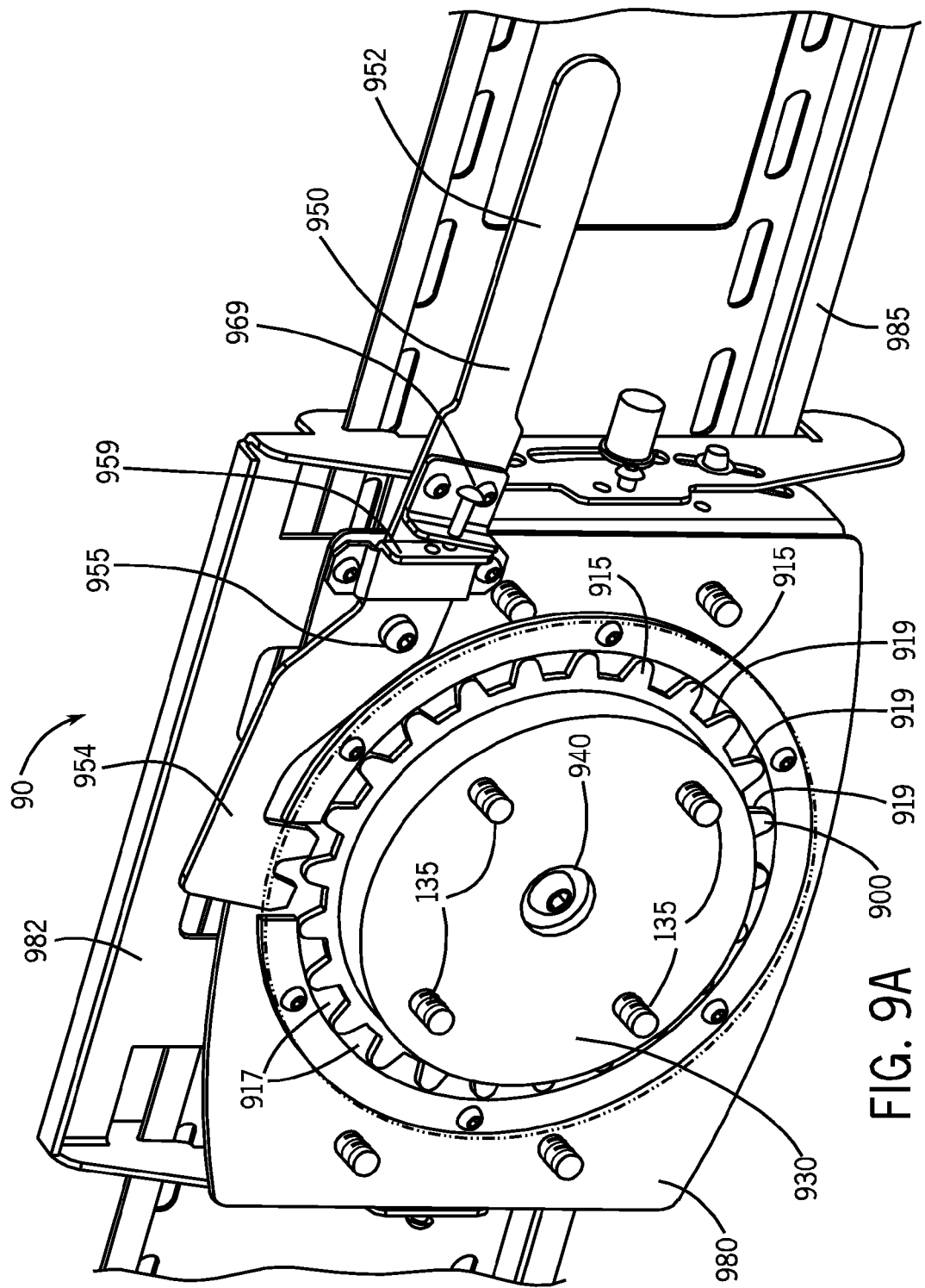
FIG. 9A is a perspective view of a rotatable display mount according to another embodiment of the present invention showing a base plate, a sprocket plate operatively connected and rotatable in relation to the base plate, an adapter plate operatively connected to the sprocket plate, a pivoting latch arm operatively connected to the base plate, a tilt mount operatively connected to the rotatable display mount, and a wall bracket operatively connected to the tilt mount and adapted for securement of the rotatable display mount to a mounting surface.
Figure 9B:
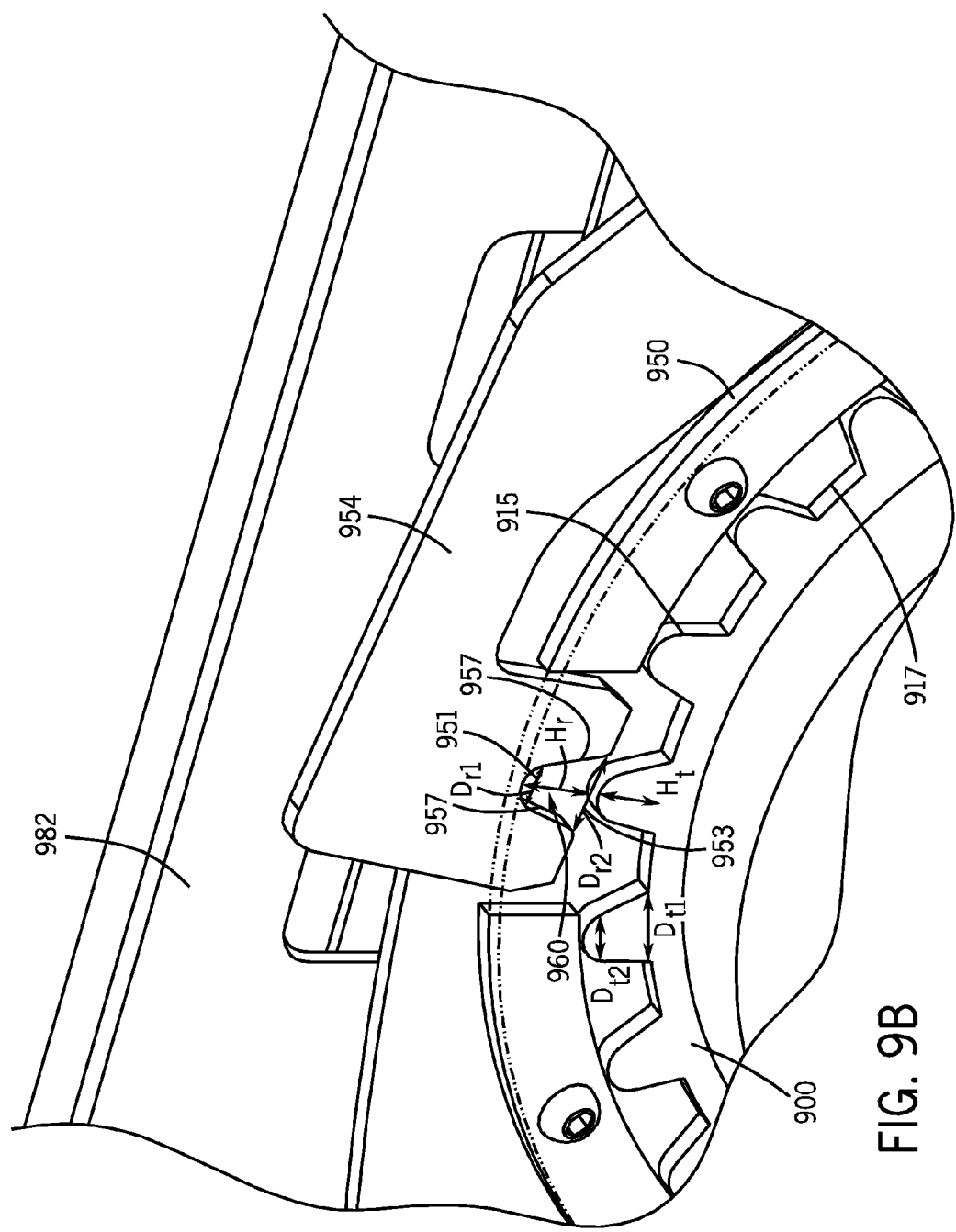
FIG. 9B is an enlarged view of a portion of the rotatable display mount shown in FIG. 9A.

Referring to FIGS. 9A and 9B, a rotatable display mount 90 constructed in accordance with another embodiment of the present invention is shown. The rotatable display mount 90 comprises a sprocket plate 900 rotatably connected to a base plate 980. The rotatable display mount 90 may further include a pivoting latch arm 950 operatively connected to the base plate 980 and selectively engageable with the sprocket plate 900.

In the embodiment of FIGS. 9A and 9B, the base plate 980 is adapted to secure the rotatable display mount 90 to a mounting surface such as a wall, ceiling, cart, stand, or other mounting surface. The base plate 980 generally comprises a relative thin and substantially rigid plate. The base plate 980 may be configured for direct attachment to the mounting surface or it may be configured to operatively couple to a wall bracket configured for securement of the rotatable display mount 90 to the mounting surface. Alternatively, the base plate 980 may be operatively connected to an intermediary mount. For example, as depicted in FIG. 9A, the base plate 980 is coupled to a tilt mount 982 that is in turn coupled to the front of a wall bracket 985. A rear surface of the wall bracket 985 is adapted for attachment of the assembly to the mounting surface.

The sprocket plate 900 is operatively connected to and rotatable in relation to the base plate 980. The sprocket plate 900 may generally comprise a relatively thin and substantially rigid circular plate. The sprocket plate 900 may further include a plurality of teeth 915 disposed about the perimeter of the sprocket plate 900. An adapter plate 930 is operatively connected to the sprocket plate 900 and adapted to rotate with the sprocket plate 900. The adapter plate 930 may be configured to directly attach to the display device or an intermediary screen adapter. The adapter plate 930 may be secured to the sprocket plate 900 by a plurality of fasteners 135.

A number of coupling structures may be employed to rotatably couple the sprocket plate 900 and the base plate 980 in order to permit relative rotation of the display device in relation to the base plate 980. As illustrated in FIG. 9A, a central fastener 940 operatively and rotatably couples the sprocket plate 900 in relation to the base plate 980.

The sprocket plate 900 may include a plurality of teeth 915 disposed about its perimeter. In general, the plurality of teeth 915 are disposed uniformly about the perimeter of the sprocket plate 900. As previously described, the plurality of teeth 915 may have a substantially trapezoidal shape. A plurality of gaps 917 are interspaced between the plurality of teeth 915. As previously described, the plurality of gaps 917 may also have a substantially trapezoidal shape.

The pivoting latch arm 950 is operatively coupled to the base plate 980. The pivoting latch arm 950 generally comprises an elongated and substantially rigid lever with a grasping end 952, an engagement end 954 disposed substantially opposite the grasping end, and a pivot axis 955 disposed between the grasping end 952 and the engagement end 954. A security fastener 969 may be operatively connected to the pivoting latch arm 950. Optionally, a security bracket 959 may be operatively connected to the base plate 980 and disposed in relation to the pivoting latch arm 950. The security fastener 969 may be selectively deployed to engage the security bracket 959 to prevent operation and disengagement of the pivoting latch arm 950.

The pivoting latch arm 950 is selectively engageable with the sprocket plate 900. Application of a torque to the pivoting latch arm 950 engages and disengages it from the sprocket plate 900. For example, as shown in FIG. 9A, a downward force on the grasping end 952 pivots the pivoting latch arm 950 about the pivot axis 955, lifting and simultaneously disengaging the engagement end 954 from the sprocket plate 900. While the pivoting latch arm 950 is disengaged the sprocket plate 900 and attached display device are freely rotatable in a plane substantially parallel to and in relation to the base plate 980. The pivoting latch arm 950 is re-engaged with the sprocket plate 900 by lifting the grasping end, thereby rotating the engagement end 954 into engagement with the sprocket plate 900.

A biasing member (not shown) may be operatively connected to the pivoting latch arm 950 to bias the pivoting latch arm 950 to an engagement orientation. The pivoting latch arm 950 may also be configured for self-engagement under normal operating conditions. For instance, the pivoting latch arm 950 may be adapted to remain engaged and/or reengage the sprocket plate 900 under the gravitational force acting on the engagement end 954. The security fastener 969 may be selectively orientated in relation to the pivoting latch arm 950 to prevent disengagement from the sprocket plate 900, thereby preventing rotation of the display device.

As previously described, the engagement end 954 is configured to substantially match the profile of the perimeter of the sprocket plate 900. To this end, the engagement end 954 may include an engagement recess 960 disposed in the engagement end 954. The engagement recess 960 is adapted to at least partially receive one or more of the plurality of teeth 915. In the engagement orientation, the pivoting latch arm 950 prevents rotation of the sprocket plate 900 and the attached display device. When the pivoting latch arm 950 is rotated from the engagement orientation, disengaging the engagement recess 960 from one or more of the plurality of teeth 915, the sprocket plate 900 and the display device are freely rotatable in relation to the base plate 980. The engagement end 954 may further include one or more adjacent engagement protrusions 958. The one or more adjacent engagement protrusions 958 are disposed in relation to the engagement recess 960 and adapted to engage one or more of the plurality of gaps 917 adjacent to one or more of the plurality of teeth 915.

The engagement recess 960 may have a substantially trapezoidal shape to correspond with the plurality of teeth 915 similarly shaped. For example, the engagement recess 960 may have a first base 951, a second base 953, and a pair of sloped lateral sides 957 extending between the first base 951 and second base 953. Accordingly, as illustrated in FIG. 9B, the engagement recess 960 may be described where the first base 951 may be of dimension $D_{r1}$, the second base 953 may be of dimension of $D_{r2}$, where $D_{r1}$ is less than $D_{r2}$. Further, the first base 951 and the second base 953 are separated by a height of dimension of $H_r$. To selectively engage the engagement recess 960 with one of the plurality of teeth 915, $D_{r1}$ must be less than $D_{r2}$. Further, it will be appreciated, to achieve maximum engagement $D_{r1}$ should be slightly less than $D_{r2}$ and $H_r$ should be slightly less than $H_t$. To further improve engagement, the slopes of the respective sloped lateral surfaces 919/957 should be about equal, such that the engagement recess 960 nests snugly within one or more of the plurality of teeth 915.

Figure 13:
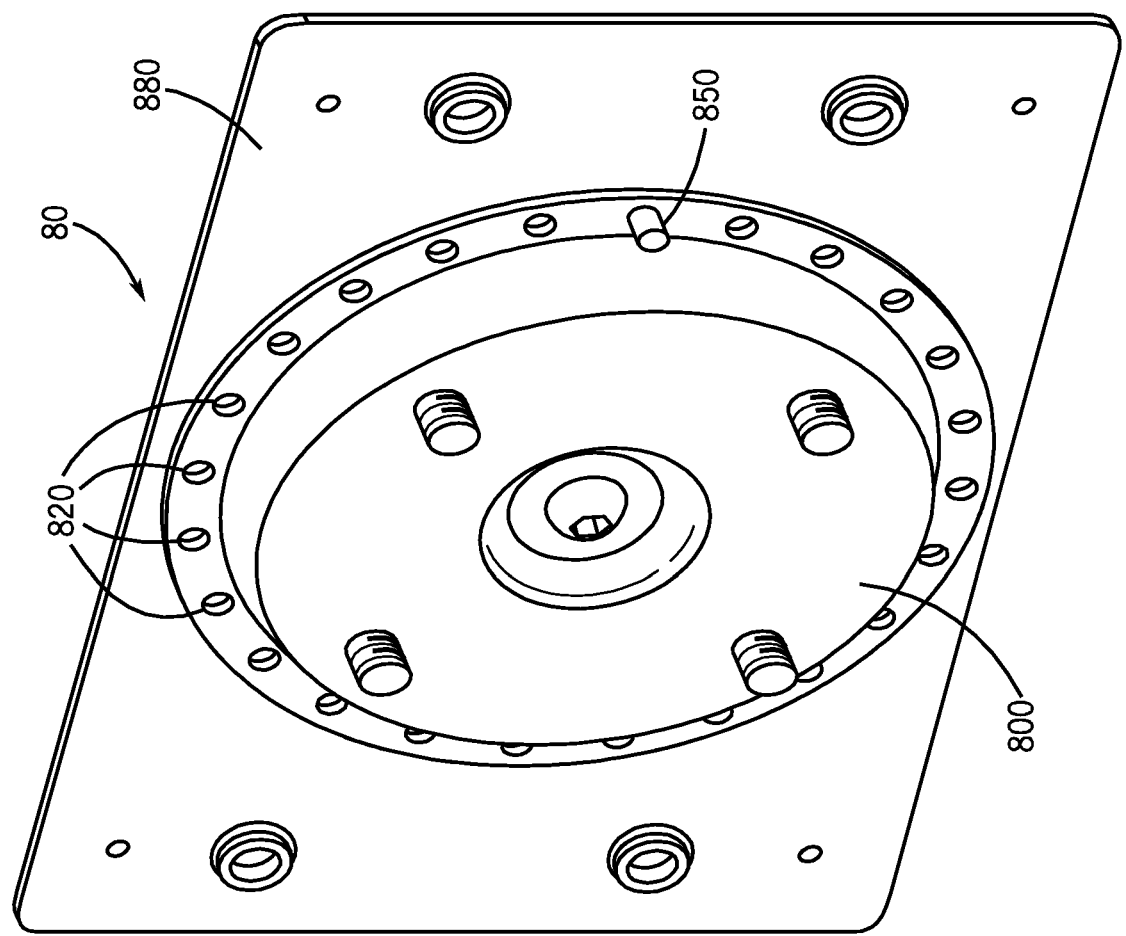
FIG. 13 is a perspective view of a rotatable display mount according to yet another embodiment of the present invention showing a base plate, a sprocket plate operatively connected and rotatable in relation to the base plate, and a latch pin operatively connected to the base plate.

Referring to FIG. 13, another embodiment a rotatable display mount 80 is depicted. The rotatable display mount 80 may comprise a base plate 880, a sprocket plate 800 operatively connected to the base plate 880 and rotatable in relation to the base plate 880, and a latch pin 850 selectively engageable with the sprocket plate 800. The sprocket plate 800 may include a plurality of holes 820 disposed in a substantially arcuate pattern on the sprocket plate 800. The plurality of holes 820 are adapted to slidingly receive the latch pin 850. When latch pin 850 is engaged in at lest one of the plurality of holes 820, rotation of the sprocket plate 800 is substantially prevented. When the latch pin 850 is disengaged from at least one of the plurality of holes 820, the sprocket plate 800 and the display device operatively connected thereto are freely rotatable in relation to the base plate 880 in a plane substantially parallel to the base plate 880. The sprocket plate 800 and operatively connected display device may be selectively orientated at a rotational orientation defined by one of the plurality of holes 820.

The rotatable display mount 10/90 flexibility and efficiently permit the selective rotational orientation of an attached display device in a plane substantially parallel to the mounting surface. It is unnecessary to remove the display device from the rotatable display mount 10/90 when rotationally orientating the display device. Thus, an attached display device may be selectively orientated between a landscape orientation and rotated 90 degrees to a portrait orientation while mounted to the rotatable display mount 10/90.

Figure 12:
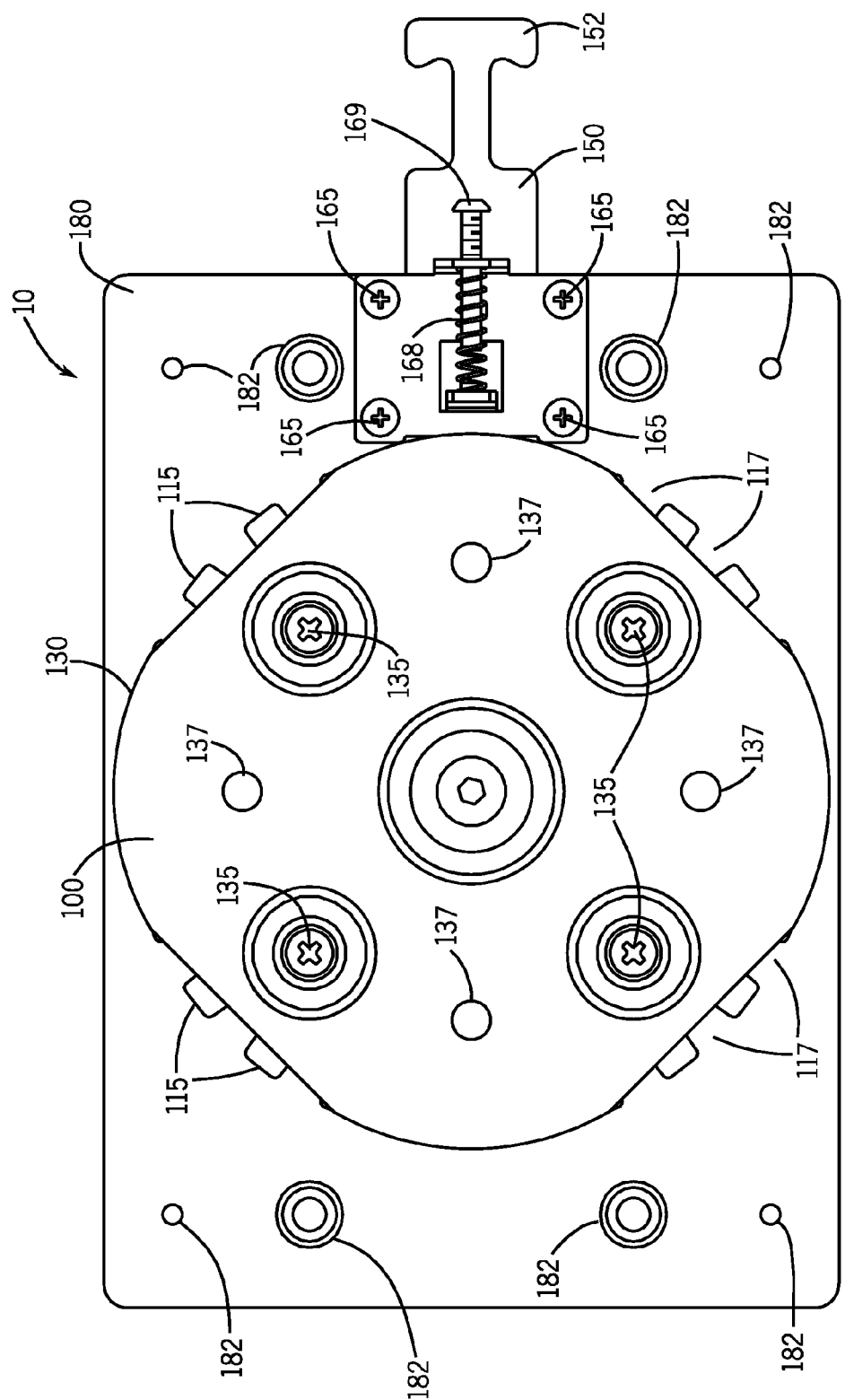
FIG. 12 is a front view of the rotatable display mount of showing the sprocket plate and the adapter plate rotated about 45 degrees from the orientation of FIG. 10.

Further, intermediate orientations are also selectable using the rotatable display mount 10/90. The total number of rotational orientations available is dependent on the number of the plurality of teeth 115/915 disposed on the sprocket plate 100/900. Each tooth of the plurality of teeth 115/915 provides a discrete, selectable rotational orientation for the attached display device. The number of available rotational increments is determined by dividing 360 degrees by the number of the plurality of teeth 115/915 disposed on the sprocket plate 100/900. For example, the embodiments of FIGS. 1 and 9, comprise 24 teeth disposed on the sprocket plate 100/900. Dividing 360 degrees by 24, yields 15 degrees. Thus, the depicted embodiments of the rotatable display mount 10/90 permit an attached display to be orientated in 15 degree increments between zero and 360 degrees. For example, the rotatable display mount 10 may be selectively rotated from a horizontal landscape orientation of about zero degrees, as shown in FIG. 11, to a rotational orientation of about 45 degrees, as shown in FIG. 12. The display device may be orientated to additional rotational orientations, in increments of about 15 degrees, in the embodiments depicted in FIGS. 1 and 9.

Other embodiments of the rotatable display mount 10/90 having finer or coarser control over the rotational orientation of the display device may be readily constructed. For example, 30 degree rotational increments can be achieved by providing the sprocket plate 100/900 with only 12 teeth. On the other hand, the rotatable display mount 10/90 may be capable of 10 degree rotational increments by using a sprocket plate 100/900 with 36 teeth. In an embodiment, the sprocket plate 100/900 comprise teeth in multiples of four teeth, such that the orthogonal orientations of 0, 90, 180, and 270 degrees may be achieved, e.g. 4, 12, 16, 20, 24, 28, 32, 36, 40, 44, 48, 52, and so forth teeth. The diameter of the sprocket plate may be accordingly adjusted to accommodate the plurality of the teeth 115/915 while providing sufficient latching engagement. Further, as the number of the plurality of the teeth 115/915 is increased, the number of teeth and adjacent gaps engaged may be increased to provide sufficient engagement.

The sprocket plate 100/900 may also be operatively connected to a display drive motor for automated rotation of the of the display device. Operation of the latch plate 150 and the pivoting latch arm 950 may also be automated by operative connection to the display drive motor or a second motor. Alternatively, the display drive motor may further include or be operatively connected to a clutch or brake adapted to substantially prevent rotation of the display device when the display drive motor is not operating. The display drive motor may be optionally coupled to a an encoder and controller to effectuate automatic rotation of the display device. The controller may be adapted for operation via a remote control device.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated.

What is claimed is:

1. An apparatus for rotatably mounting a display device to a mounting surface comprising:
   a base plate;
   a sprocket plate operatively connected and rotatable in relation to the base plate, the sprocket plate including a plurality of engagement features disposed about at least a portion of its perimeter, the sprocket plate further configured to operatively connect to a display device; and
   a latch member operatively coupled to the base plate, the latch member selectively engageable with one or more of the plurality of engagement features,
   wherein the sprocket plate is selectively rotatable in relation to the base plate in a plane substantially parallel to the mounting surface, and wherein rotation of the sprocket plate is substantially prevented when the latch member is engaged with the one or more of the plurality of engagement features.

2. The apparatus of claim 1, wherein the latch member is slidingly translatable between an engaged orientation and a disengaged orientation, and wherein the sprocket plate is rotatable when the latch member is in the disengaged orientation.

3. The apparatus of claim 1, wherein the plurality of engagement features comprise a plurality of teeth extending from the perimeter of the sprocket plate and a plurality of gaps interposed between each of the plurality of teeth.

4. The apparatus of claim 3, wherein the plurality of teeth comprise a substantially trapezoidal shape, and wherein the plurality of gaps comprise a substantially trapezoidal shape.

5. The apparatus of claim 4, wherein at least a portion the latch member comprises a substantially trapezoidal shape configured to be at least partially received in at least one of the plurality of gaps.

6. The apparatus of claim 1, wherein the sprocket plate is rotatable at least about 90 degrees, and wherein the rotational orientation of the sprocket plate is securable by the latch member at a plurality of rotational orientations from about zero degrees to about 90 degrees.

7. The apparatus of claim 1, wherein the sprocket plate is rotatable at least about 180 degrees, and wherein the rotational orientation of the sprocket plate is securable by the latch member at a plurality of rotational orientations from about zero degrees to about 180 degrees.

8. The apparatus of claim 1, wherein the sprocket plate is rotatable at least about 360 degrees, and wherein the rotational orientation of the sprocket plate is securable by the latch member at a plurality of rotational orientations from about zero degrees to about 360 degrees.

9. The apparatus of claim 1, wherein each of the plurality of rotational orientations is disposed at least about 10 degrees from an adjacent rotational orientation.

10. The apparatus of claim 1, wherein the plurality of engagement features comprise a plurality of holes disposed on the sprocket plate in a substantially arcuate pattern.

* * * * *